Aug. 8, 1939.   A. A. COLLINS   2,168,326
AUTOMATIC TUNING SYSTEM AND APPARATUS
Filed Feb. 1, 1937   4 Sheets-Sheet 1
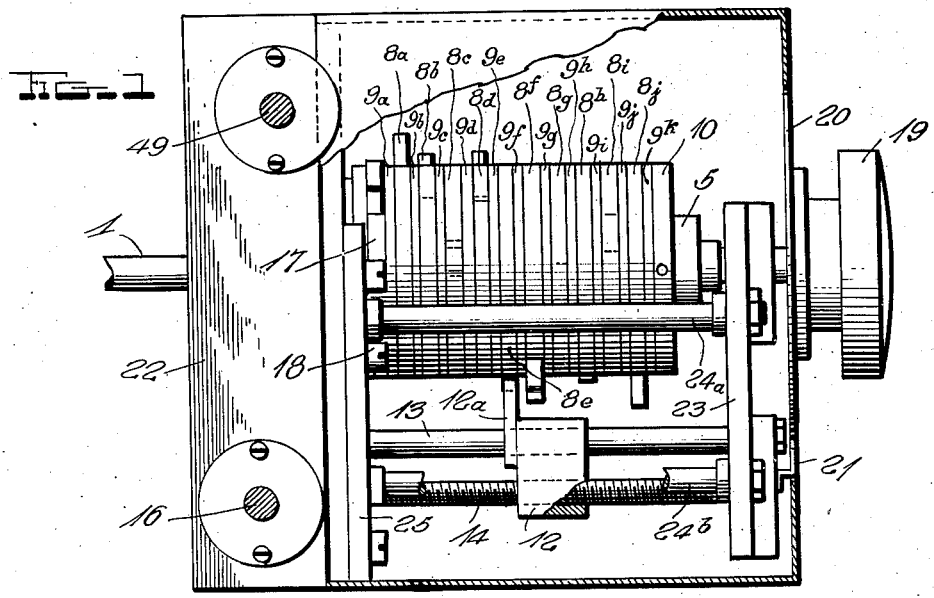
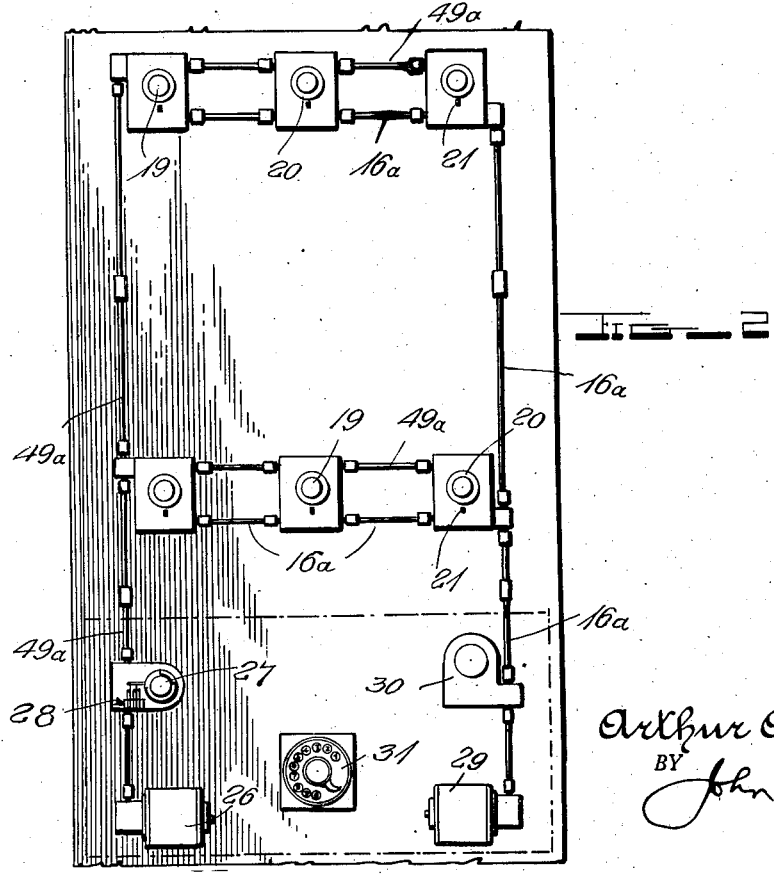
INVENTOR.
Arthur A. Collins,
BY John B. Brady
ATTORNEY.

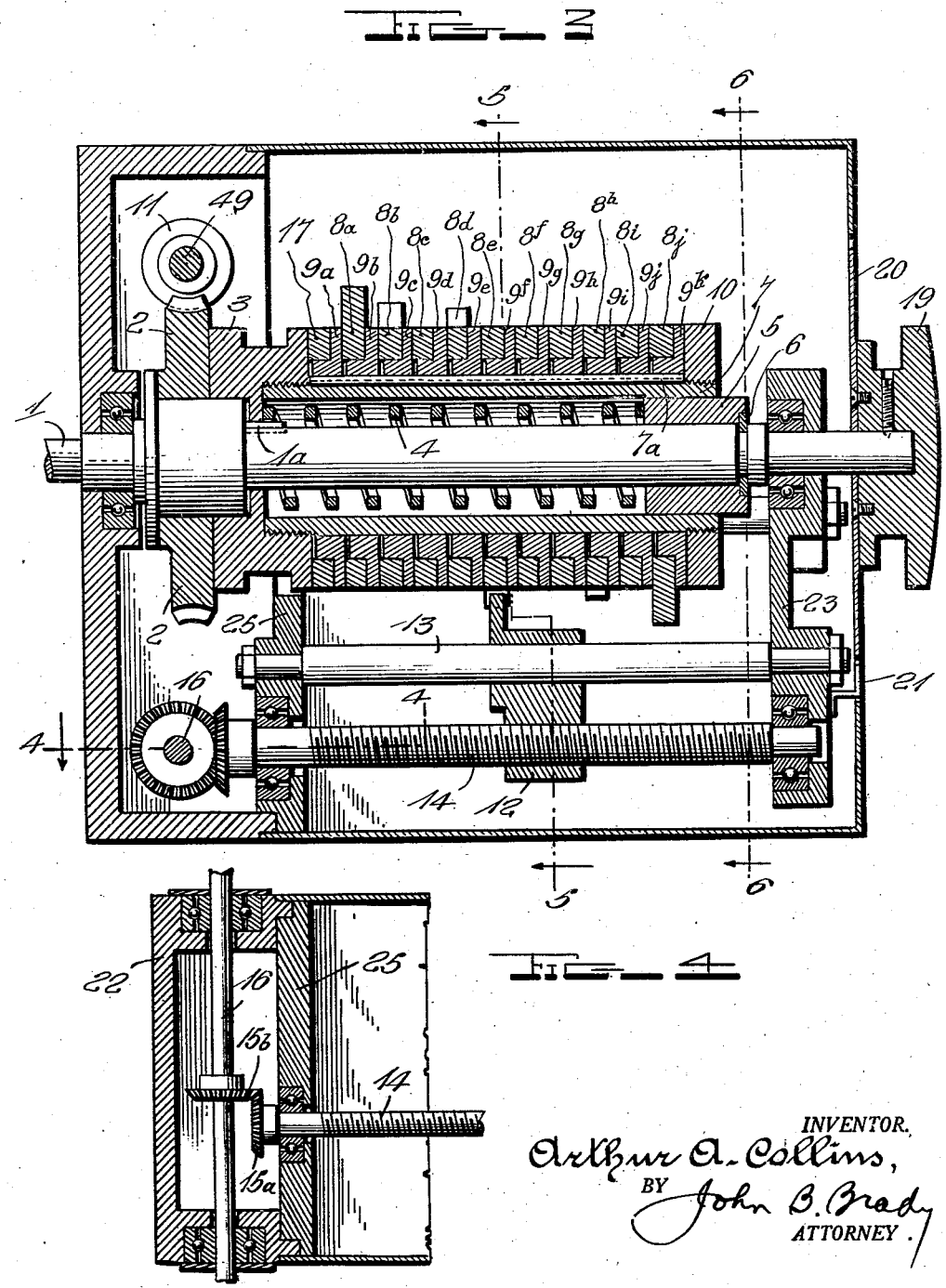

Aug. 8, 1939.   A. A. COLLINS   2,168,326
AUTOMATIC TUNING SYSTEM AND APPARATUS
Filed Feb. 1, 1937   4 Sheets-Sheet 3
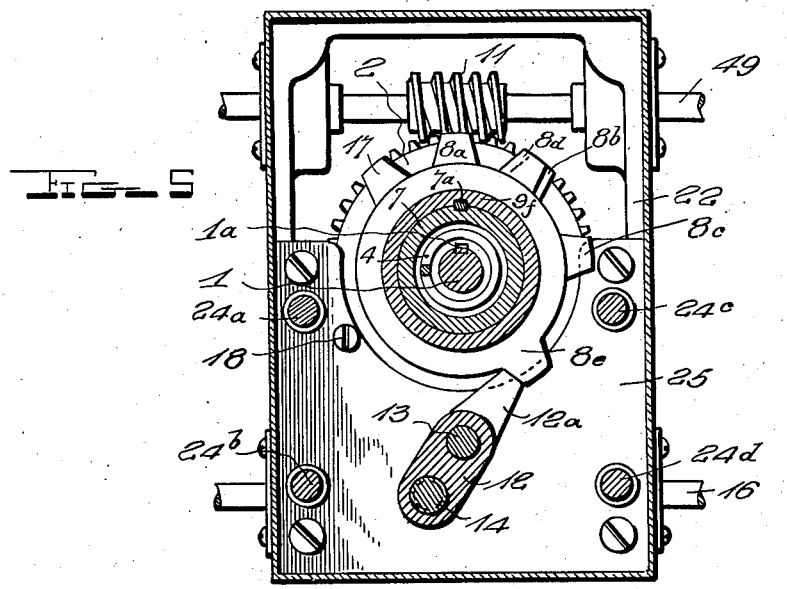
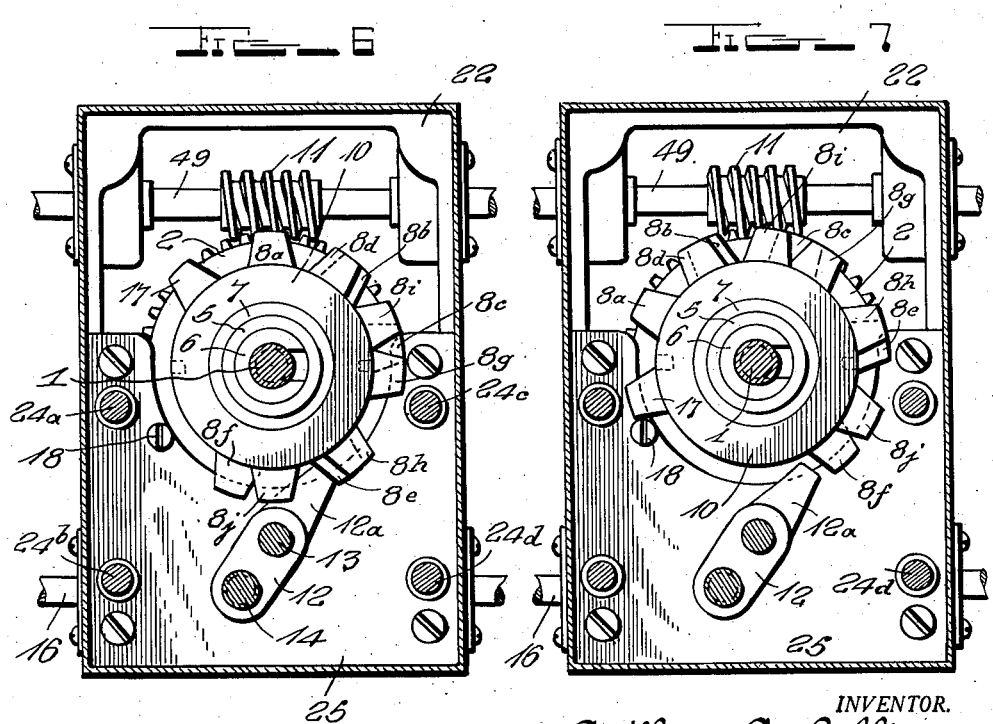
INVENTOR.
Arthur A. Collins,
BY John B. Brady
ATTORNEY.

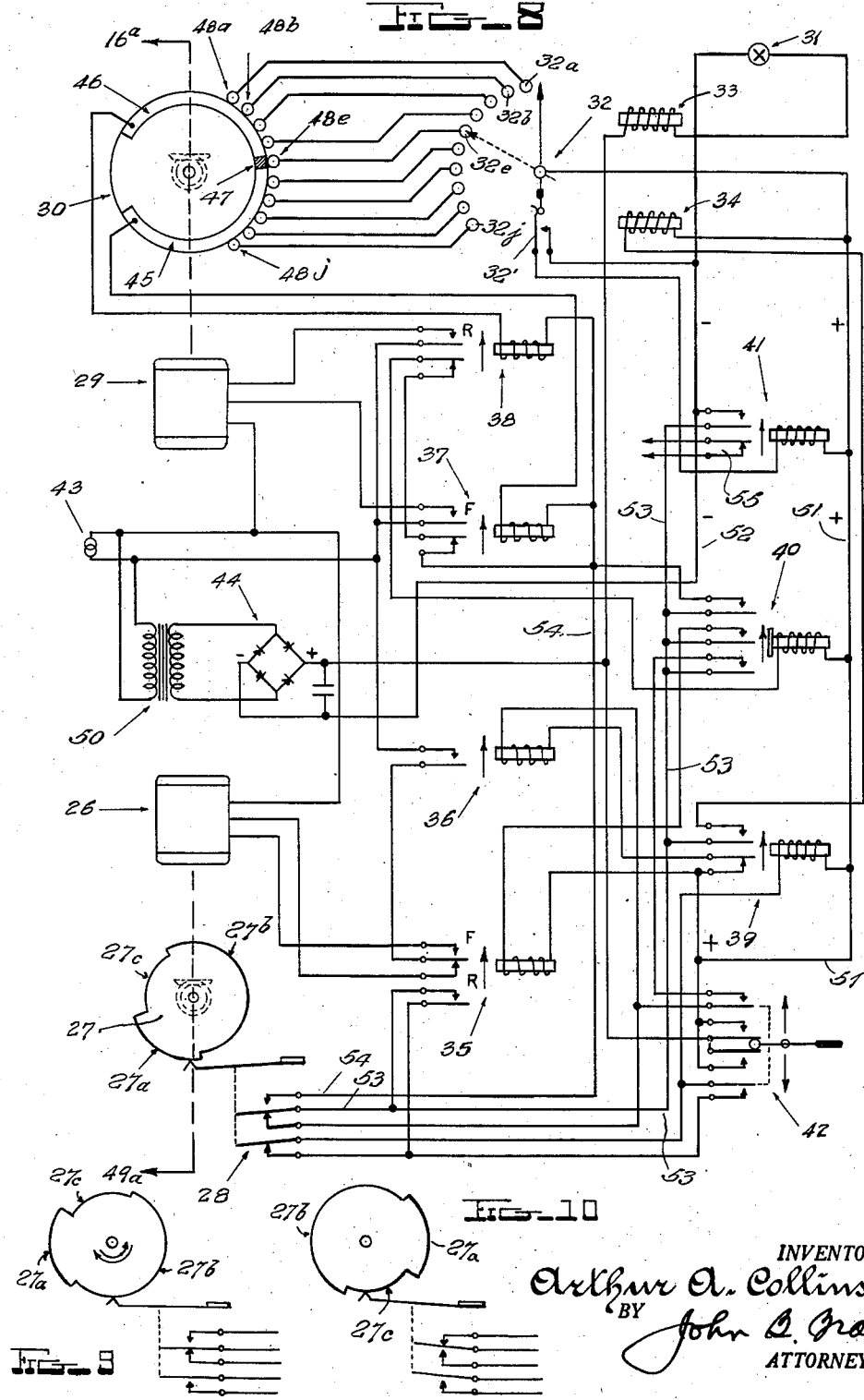

Patented Aug. 8, 1939

2,168,326

UNITED STATES PATENT OFFICE 2,168,326

AUTOMATIC TUNING SYSTEM AND APPARATUS

Arthur A. Collins, Cedar Rapids, Iowa

Application February 1, 1937, Serial No. 123,453

17 Claims. (Cl. 192—139)

My invention relates broadly to radio transmitting and receiving apparatus and more particularly to tuning apparatus and means for automatically changing the tuning in one or a plurality of circuits.

One of the objects of my invention is to provide mechanically compact and efficient means for actuating variable tuning devices and setting the same tuned to any one of a plurality of predetermined frequencies.

Another object of my invention is to provide means for simultaneously and automatically adjusting the tuning devices in a plurality of circuits, regardless of the relative angular position of the actuating shafts thereof, in corresponding tuned conditions.

A further object of my invention is to provide readily adjustable selector devices for altering the several frequencies to which a circuit is adapted to be tuned automatically by the apparatus of my invention.

Still another object of my invention is to provide means for automatically and simultaneously selecting in a plurality of tuning devices the particular frequency to which the several devices will be automatically set, regardless of the relative angular position of the actuating shafts thereof at the selected frequency.

A still further object of my invention is to provide a mechanical shaft positioning device having a plurality of stop rings adjustably disposed axially on the shaft, a selector stop arranged to engage one of the stop rings and means for rotating the shaft until the stop is engaged with the selected stop ring.

Still another object of my invention is to provide means for adjusting any one of a series of stop rings arranged on a shaft independently of the other stop rings, and locking means common to all the stop rings for securing all of them in adjusted positions.

And another object of my invention is to provide friction clutch driving means for a shaft in combination with a series of stop rings and a stop for positioning the shaft as determined by any one of the stop rings in coaction with the stop, while the driving means operates for a predetermined constant time interval.

Other and further objects of my invention reside in the apparatus and arrangements hereinafter more fully set forth, with reference to the accompanying drawings in which:

Figure 1 is a side elevation view of the shaft positioning mechanism, with the casing therefor broken away to show the stop rings and the adjustable stop; Fig. 2 is a front elevation of a panel arrangement showing a plurality of shaft positioning mechanisms mounted thereon and interconnected with an automatic setting device enclosed within the broken line and shown in detail in Fig. 8; Fig. 3 is a vertical longitudinal sectional view of the shaft positioning mechanism; Fig. 4 is a detailed horizontal sectional view thereof taken substantially on line 4—4 in Fig. 3; Fig. 5 is a cross sectional view of the shaft positioning mechanism on line 5—5 in Fig. 3; Fig. 6 is another cross sectional view thereof on line 6—6 in Fig. 3, showing in end elevation the stop ring assembly of the shaft positioning mechanism; Fig. 7 is a view similar to Fig. 6 showing the stop ring assembly in home position with the path clear for movement of the selector stop; Fig. 8 is a schematic diagram showing a motor drive, relay and switch arrangement for automatically operating the shaft positioning mechanism in accordance with a prearranged cycle; and Figs. 9 and 10 are detailed schematic diagrams of the cam switch of Fig. 8 in different phases of operation.

The principal object of this invention is the automatic tuning of a radio transmitter or receiver having a plurality of tuning controls, so that it may operate on a number of predetermined frequencies. I will describe the application of my invention specifically to a transmitter, although it is apparent that application to devices other than transmitters can be made. The problem of shifting the operating frequency of a transmitter is a very important one, especially on high frequencies, where the frequencies must be changed from time to time during the day in order to obtain satisfactory communication. It is also desirable to shift the frequency of the transmitter rapidly in order to handle traffic on more than one channel with a single transmitter. Up to the present time, transmitters have been arranged for multi-frequency operation by providing separately tuned circuits for each frequency, and some form of switching means for selecting the desired set of tuned circuits. This system has practical limitations because of the complexity of circuit connections and switching apparatus which must be used in a multi-stage transmitter operating on more than two or three frequencies.

The arrangement of my invention overcomes the practical difficulties inherent in previous systems, and, in addition, is compact and flexible in adjustment. This arrangement consists essentially of a system of mechanical positioning mechanisms applied to the rotating shafts of the adjustable tuning units of the transmitters, and interconnected in such a way with suitable actuating means that a group of dialed energy impulses will act to position each of the tuning shafts to the desired angular position corresponding to the correct adjustment for each frequency. The angular position of each tuning shaft may be independently predetermined for ten or more independent tuning adjustments, and a like number of different frequencies may thus be selected by corresponding groups of dialed impulses.

Referring to the drawings in more detail, Figs. 1 and 3-7 illustrate a positioning assembly adapted to be associated with each rotating tuning element of a radio transmitter as indicated in Fig. 2. A drive shaft 1 is directly connected to the shaft of a tuning element such as a variable condenser, not shown. As illustrated particularly in Fig. 3, there are mounted coaxially on this shaft a wheel gear 2, a clutch plate 3, a clutch spring 4, a collar 5, a collar retainer 6, a stop ring cylinder 7, a series of stop rings 17, 8a, 8b, 8c,—8j, a series of stop ring spacers 9a, 9b, 9c,—9k, and a locking ring 10. The stop ring cylinder 7 is fixed to the clutch plate 3, preferably by screw threads, as shown, and this assembly is keyed or splined as at 1a to the drive shaft 1 so that it is free to move axially on the drive shaft, but is not free to rotate with respect to the drive shaft. Clutch spring 4 maintains pressure betwen the clutch plate 3 and the worm wheel gear 2, while the collar 5 and retainer 6, shown more clearly in Fig. 6, provide a fixed abutment for the clutch spring 4. The worm wheel gear 2 engages a worm gear 11 mounted on a drive shaft 49, so that the rotation of the worm gear is transmited by frictional engagement between the worm wheel gear 2 and clutch plate 3 to the shaft 1.

A stop carriage 12 having a projecting stop 12a is free to move on the guide 13 under action of lead screw 14, in a line parallel to drive shaft 1. Lead screw 14 is rotated by selector shaft 16 through the action of bevel gears 15a and 15b. Stop 12a is shaped to engage a projecting tooth on each of the stop rings 8a, 8b, 8c,—8j selectively; the selector shaft 16 being rotated to bring the stop in the plane of the selected stop ring. The angular position of the tooth on each stop ring is pre-set by loosening the locking ring 10, screw-threaded on the cylinder 7, and rotating the respective stop rings. The stop ring spacers 9a, 9b, 9c,—9k, are keyed into the stop ring cylinder 7, as by key 7a, so that manual rotation of a single stop ring, when the locking ring 10 is loosened, will not disturb the positions of adjacent stop rings. Stop ring 17 engages the homing stop 18, as shown particularly in Fig. 7, at the initial or home position of drive shaft 1, in which position stop 12a is free to move on guide 13 without interference with the teeth or stop rings 8a, 8b, 8c,—8j, which are never set in the same angular positions and which therefore may block the movement of the stop 12a, as is evident from Fig. 6. Knob 19 and graduated or calibrated dial 20 are rigidly affixed to drive shaft 1 and serve for manual rotation of the drive shaft, and for indication of its angular position by reference to a dial indicator 21.

The mechanism just described is preferably assembled on a cast base 22, a base plate 25, and a front plate 23, supported by posts 24a,—24d, in spaced relation with respect to base plate 25. Shaft bearings are preferably of the anti-friction type, incorporating self lubricating dust seals, and the device may be inclosed by an extruded metal cover as indicated.

A positioning mechanism as just described is provided for each tuning element of the transmitter as broadly shown in Fig. 2. These tuning elements may consist of variable condensers, variable inductors, rotating switches, etc. and any desired number of positioning mechanisms may be used, one for each adjustable tuning control. The worm drive shafts 49 of each positioning mechanism are interconnected by suitable light shafting 49a as shown, so that the worm drive shafts on all of the positioning mechanisms rotate in unison. The selector shafts 16 are likewise linked together by means of a separate system of shafting 16a, so that rotation of this shaft system brings the stops 12a into the planes of corresponding stop rings simultaneously on all of the positioning mechanisms. It is apparent that flexible shafting, or rigid shafting with a system of angular gears and universal couplings, may be used to allow each of the positioning mechanisms to be conveniently disposed with respect to its tuning control. Automatic means for actuating the shaft systems 49a and 16a is indicated within the broken line box in Fig. 2 and fully shown schematically in Figs. 8, 9 and 10.

Referring now particularly to Fig. 8, the system of shafting associated with worm drive shaft 49 is mechanically connected to reversible motor 26. Also mechanically connected through suitable gearing to the worm drive shaft system and motor 26 is a cam 27, the lobes of which operate cam switch 28. The system of shafting associated with selector shafts 16 is mechanically connected to reversible motor 29. Also mechanically geared to the selector shaft system and motor 29 is positioning switch 30. An impulse dial switch 31 is shown in operative relation with a minor switch 32 having working contacts 32a, 32b,—32j, off-normal contact 32', operating coil 33, and release coil 34. Fig. 8 also shows motor control relays 35, 36, 37 and 38; operation sequence relays 39, 40 and 41; and manual master control switch 42; the operations of which are hereinafter defined.

Selector shaft positioning switch 30 comprises two metallic segments 45, 46, separated by an insulating segment 47, mounted on a disk member rotated by the operation of motor 29. A plurality of contact points 48a, 48b,—48j, are arranged to make contact with segments 45, 46, 47, and proportions are such that insulating segment 47 can be in contact with only one contact point 48a, 48b,—48j, at any given position of the selector shaft system. The entire selector shaft system is such that contact with segments 45, 46, 47, and proportions are such that insulating segment 47 can be in contact with only one contact point 48a, 48b,—48j, at any given position of the selector shaft system. The entire selector shaft system is such that contact between insulating segment 47 and one of the contact points 48a, 48b,—48j, corresponds to the position of selector stop 12a, with reference to one of the stop rings 8a, 8b,—8j, so that when insulating segment 47 touches contact 48e, for example, stop 12a is in the same plane as stop ring 8e.

Two sources of electrical energy may be used for operating the system. These sources are represented as alternator 43, which may be in commercial power circuits, for operating the motors; and rectifier 44, which may be connected to commercial power circuits through a transformer 50, as indicated. It is understood that the rectifier 44 is employed to obtain direct current for operation of the various relays, as their design may be simplified by the use of direct current. A single source of electrical energy, such as a low voltage battery, may be used for both the motors and the relays.

One terminal of operating coil 33 is connected directly to rectifier 44; and the circuit is completed through dial switch 31 and lead 52 back to the rectifier 44. The release coil 35 is connected through lead 51 and switch 42 to one side of the rectifier 44; and the circuit is completed through the upper terminals of sequence relays 39 and 41 and lead 52 back to the rectifier 44.

Motor control relay 35 is connected through switch 42 to one side of the rectifier 44; and the circuit is completed through the intermediate contacts of sequence relay 40, lead 53, the upper contacts of sequence relay 41, and lead 52 back to the rectifier 44. Motor control relay 36 is connected through the lower contacts of sequence relay 39 and switch 42 to one side of the rectifier 44; and the circuit is completed through the cam switch 28, lead 53, the upper contacts of sequence relay 41, and lead 52 back to the rectifier 44. Another circuit for relay 36 may be completed through separate contacts in manual switch 42, the lower contacts of sequence relay 40, lead 53, and relay 41, as above, back to rectifier 44.

Motor control relays 37 and 38 are connected with one side of the rectifier 44 through lead 54, cam switch 28, lead 53, sequence control relay 41, and lead 52. A circuit to relay 37 or relay 38 is separately completed through segmental contact 45 or 46, respectively, any one of contacts 48a—48j and the corresponding one of contacts 32a—32j, the contact arm of minor switch 32, lead 51 and switch 42, back to the rectifier 44.

Sequence control relay 39 is connected through lead 51, and switch 42 to one side of the rectifier 44; and the circuit is completed through cam switch 28, auxiliary contacts on motor control relay 35, lead 53, sequence control relay 41, and lead 52 back to rectifier 44. Another circuit for relay 39 may be completed through separate contacts in manual switch 42, thence to relay 35 and back to the rectifier 44, as above.

Sequence control relay 40 is connected through lead 51 and switch 42 to one side of the rectifier 44; and the circuit is completed through auxiliary contacts on motor control relays 38 and 37, lead 54, cam switch 28 and lead 53, sequence relay 41, and lead 52 back to the rectifier 44. A self-maintained shunt circuit for relay 40 is provided through the auxiliary contacts on relays 38 and 37, the upper contacts on relay 40 itself, and lead 53, relay 41 and lead 52, as above, back to the rectifier 44.

Sequence control relay 41 is connected through lead 51 and switch 42 to one side of the rectifier 44; and the circuit is completed through the off-normal contacts 32' of minor switch 32, and lead 52 back to the rectifier 44.

Reversible motor 26 is connected directly with one side of source 43; and the circuit is completed for forward or reverse operation through separate contacts on motor control relay 35, and series contacts on motor control relay 36 back to the source 43. Reversible motor 29 is connected directly to one side of the source 43; and the circuit is completed for forward operation through relay 37, or for reverse operation through relay 38, back to the source 43.

The sequence of operation of the system is as follows: Assuming that the stop rings on each of the positioning mechanisms have been fixed in accordance with manual adjustment for each frequency desired, and that the transmitter is in operation on the frequency corresponding to stop rings 8a. The cam 27 will be in "operating" position with respect to the cam switch 28; that is, the switch actuating member contacts the raised cam lobe 27a, and the lower switch contacts are closed, as in Fig. 8. To facilitate description, I will hereinafter refer to the cam switch 28 as having a single pole, double throw, (SPDT) portion, and a single pole, single throw, (SPST) portion. In the "operating" position of the switch 28 therefore, the SPDT portion has the lower contacts closed, and the SPST portion is closed.

To effect a different frequency adjustment, the operator dials, say number "5" corresponding to another frequency of operation, which produces, by means of the impulse device 31, five impulses. Each impulse moves the contact arm on minor switch 32 one step, through the action of operating coil 33, so that the contact arm reaches the fifth contact 32e, as shown by dotted line in Fig. 8. This action also closes the off-normal contact 32' of the minor switch 32. Now assuming manual switch 42 in its lower position operating the upper set of contacts, then sequence relay 41 is energized through conductors 51 and 52, and the upper two of the contacts thereof complete a circuit to conductor 53 to operate worm drive shaft motor switch relay 36 through the lower contacts of the SPDT portion of switch 28, and the lower contacts of relay 39 which are normally closed. Operation of switch relay 36 applies power to motor 26 through the normally closed lower contacts of motor control relay 35, and the motor operates to rotate the worm drive shaft system 49a and cam 27 in a "reverse" direction so as to bring all of the stop rings 17 against home stops 18. During this interval the cam switch actuating member rides on the "running" portion 27b of the cam 27; and the SPDT portion of switch 28 will have the lower contacts closed but the SPST portion will have been opened. This condition of the cam and cam switch is illustrated in Fig. 9.

It is to be noted, that drive shafts 1 of each of the positioning mechanisms will rotate through various angles before reaching home position, depending upon their previous set positions, but in no case will any of the drive shafts be required to rotate through more than, say 180°. The clutch arrangements on each of the drive shaft assemblies prevents interference with the rotation of any of the positioning mechanisms by reason of limitations in any one of them; so that, for example, if the positioning mechanism which has rotated through the smallest angle to reach "home" position has done so, the clutch in that positioning mechanism permits its worm and wheel gearing to continue to rotate so that the others of the mechanisms may reach their "home" positions.

Cam 27 is shaped so that it operates the cam switch 28 after the worm shaft system has rotated through an angular displacement corresponding to a rotation of any drive shaft 1 of approximately 200°, which rotation is sufficient to return all of the positioning mechanisms to the "home" position. This portion of the cam 27 consists of a depression 27c, and upon being engaged with the cam switch actuating member causes the upper contacts of the SPDT portion of the cam switch to close, the SPST portion remaining open. This condition of the cam and cam switch is illustrated in Fig. 10. Operation of the SPDT portion of cam switch 28, thus acts to deenergize relay 36, therefore stopping motor 26, and also to complete circuits by way of conductor 54 through relays 37 and 38, positioning switch 30, and minor switch 32, and through relay 40, to conductor 51.

If the minor switch 32 is set on the fifth contact 32e, as supposed, current can only flow from conductor 51 through the fifth contact point 48e on selector switch 30. If a circuit is completed through contact 48e, segment 45, and motor control relay 37, the selector shaft motor 29 is caused to rotate in such a direction that insulating segment 47 moves toward contact 48e. When insulating segment 47 touches contact 48e, the circuit through relay 37 is broken, and the motor 29 and selector shafts 16 cease rotating with the stops 12a positioned opposite stop rings 8e. If, due to mechanical inertia, insulating segment 47 is carried past contact point 48e, or should the segment 47 have been originally beyond the contact 48e, say at contact 48j, then a circuit is completed including contact 48e, segment 46, and motor control relay 38, causing motor 29 to rotate in the opposite direction until insulating segment 47 meets contact 48e.

The auxiliary contacts on relays 37 and 38 are connected in series with the operating coil of sequence relay 40, which relay is designed to operate only after it has been energized for a predetermined time interval, which may be a fraction of a second. Thus, after the insulating segment 47 of selector switch 30 has interrupted the connection to the fifth contact 48e for this predetermined interval, during which neither relay 37 or 38 will be operated and the mechanical system associated with the selector shafting will have come to rest, sequence relay 40 will operate. The upper group of contacts of relay 40 upon being closed provide a separate circuit for energizing the coil of relay 40 from conductors 51 and 53, and the relay 40 thus will remain operative after conductor 54 becomes disconnected from conductor 53 and the power supply by operation of the SPDT portion of cam switch 28.

The lower two groups of contacts of sequence relay 40 complete circuits from conductor 53 to energize relays 35 and 36 separately, which apply power to motor 26 for running it in a "forward" direction, as determined by the upper contacts of relay 35, for a period corresponding to approximately 200° rotation of any drive shaft 1, as aforesaid during which interval, cam 27 is rotating in a "forward" direction in a corresponding amount. During this "forward" movement of the cam, the cam switch actuating member again rides on the "running" portion 27b of the cam 27, and eventually meets the raised cam lobe 27a in the "operating" portion of the cam which actuates cam switch 28 so that the SPST portion is closed, the SPDT portion being conditioned, with the lower contacts closed, for future operations. Operation of the SPST portion of the cam switch, in series with the closed auxiliary contacts of relay 35, which remain closed because relay 40 remains energized, completes a circuit which operates relay 39 for closing contacts which momentarily operate to energize release coil 34 of the minor switch 32, and remove power from the entire system. Relays 41, 40, 39 and 35, when once energized at their respective points in the cycle, remain operative until action of the minor switch release coil 34 has restored the minor switch and opened the off-normal contact 32', thus removing power from the entire sequence relay circuit. When this has taken place, no further action of either motor can occur until the minor switch is again actuated.

The sequence relay 41 has auxiliary contacts at 55 which remove power from the transmitter itself at the beginning of the automatic tuning cycle and re-apply power to the transmitter at the completion of the tuning cycle.

Manual switch 42 when in center position allows the minor switch to be set up, but prevents further operation. When in the lower position, operating the upper set of contacts, normal operation is obtained, as hereinbefore described. When in the upper position, operating the lower set of contacts, the cycle takes place up to the energization of relay 35 through the middle contacts of relay 40, which closes the auxiliary contacts on relay 35. A circuit is thereby completed through relay 39 by way of the lowermost contacts of switch 42 and all power is removed from the system. The stop rings 8a, 8b,—8j, are thus left in "home" position, but the stops are in the position corresponding to the number dialed. This part-cycle operation is employed when adjusting the stop rings after tuning the transmitter, the stop rings corresponding to the position of the stops being manually rotated until they abut the stops, with the instrument shafts in adjusted positions for one desired frequency. This operation may then be successively repeated for adjustment of the other stop rings for different frequencies.

The full cycle of operation of the automatic positioning device may be described less specifically as follows: An impulse transmitter of the kind commonly used for dial telephone circuits is operated to send a series of impulses to a system of control relays. The control relays influence the operation of two motors so that: first, the tuning control shafts of the transmitter are rotated in a "reverse" direction and returned to "home" position; second, the stops on all of the positioning mechanisms are moved into the planes of the stop rings, adjusted for the desired frequency; third the tuning shafts are rotated in a "forward" direction until all of the corresponding stop rings are rotated into contact with the stops, bringing each tuning element into the desired angular position. It is possible to construct a system as described which will complete the cycle of operations between the tuning adjustment for one frequency and that of another frequency in five seconds or less.

It is to be understood that many modifications can be made in the apparatus without departing from the plan of my invention. For example, the stops engaging the stop rings can be moved by means of a rack and pinion instead of by means of a lead screw as described heretofore; or the stops can be moved into position by means of a solenoid, ratchet and pawl actuated by the dial impulses. A further possible modification of my system is to place the slip clutch on the worm drive shaft rather than on the instrument shaft. Another modification is to utilize a multi-point manual switch in place of a minor switch. Another possible modification is the use of separate magnetic latches actuated selectively to engage the stop rings in place of a single mechanical stop moved from the plane of one stop ring to that of another. A further modification of my invention involves the use of a single motor instead of two with a selective transmission, so that the single motor actuates the worm drive shaft system and the selector shaft system alternately. However, as the power requirements of the motors is small, it is more convenient to employ two motors as described above than to use a single motor with selective transmission. The specific embodiment I have disclosed has practical merit, but modifications may be made therein as indicated above, and I intend no limitations upon my invention except as are imposed by the scope of the appended claims.

What I claim as new and desire to secure by Letter Patent of the United States is as follows:

1. Shaft positioning mechanism comprising a series of stop rings having projecting lugs adjustably mounted with respect to the shaft, a stop movable on a line parallel to the axis of the shaft adjusted for coaction with the projecting lug on a selected one of said stop rings, and means for rotating the shaft in one direction to a position wherein all of said projecting lugs have been rotated beyond the line on which said movable stop is adjusted to selected position and for rotating the shaft in the opposite direction to bring the lug on the selected one of said stop rings into contact with the stop.

2. In a mechanical shaft positioning system, a plurality of shafts, an assembly comprising a series of stop rings variably disposed axially on each of said shafts, a stop movable parallel to the axes of the shaft in each assembly, means for simultaneously moving all said stops to like selected positions for engagement respectively with one of the corresponding series of stop rings, mechanical transmission means interconnecting said shafts, and means interposed between said transmission means and each of said shafts and so constructed and arranged that various degrees of rotation may be effected in said shafts for a predetermined maximum rotation of said transmission means.

3. A mechanical shaft positioning system comprising a series of stop rings disposed axially on the shaft, a stop, and means for moving said stop parallel to the axis of the shaft including a motor and transmission means connected with said stop, and switch means electrically connected with said motor and actuated by said transmission means, for automatically setting said stop for coaction with a predetermined stop ring of said series.

4. A mechanical shaft positioning system as set forth in claim 3 and wherein said switch means comprise a series of fixed contacts and a pair of movable segmental contacts separated by a segment of insulation adapted to embrace any one of said fixed contacts, said segmental contacts being connected with the motor and operative through contact with a selected one of said fixed contacts to control the direction of movement of said motor and, therefore, of said stop.

5. In a shaft positioning system, an assembly comprising a series of stop rings disposed axially on the shaft, a movable stop adapted for coaction with a selected one of said stop rings, motor means for setting said stop in alignment with the selected stop ring, motor means for rotating said shaft to bring the selected stop ring into contact with the stop, and automatic control means connected with said motor means and operative in a predetermined sequence for actuating said motor means to establish the shaft in the desired position.

6. In a shafting positioning mechanism, a drive wheel rotatably mounted on the shaft and provided with a clutch facing, a clutch plate slidably and non-rotatably mounted on the shaft adjacent the clutch face of said drive wheel, a coil spring concentric with respect to said shaft, a collar fixedly mounted on said shaft with said coil spring compressed between said collar and said clutch plate, a plurality of stop rings adjustably mounted with respect to said shaft in connection with said clutch plate and concentric with said coil spring, and a movable stop adapted for coaction with a selected one of said stop rings.

7. In a shaft positioning mechanism, a drive wheel rotatably mounted on the shaft and provided with a clutch facing, a clutch plate slidably and non-rotatably mounted on the shaft adjacent the clutch face of said drive wheel, a coil spring concentric with respect to said shaft, a collar fixedly mounted on said shaft with said coil spring compressed between said collar and said clutch plate, a cylindrical member fixed to said clutch plate concentric with said coil spring, a plurality of stop rings adjustably mounted with respect to said member, a plurality of ring spacers slidably and non-rotatably mounted on said member, means engaging said member for clamping said stop rings and said ring spacers, and a movable stop adapted for coaction with a selected one of said stop rings.

8. In a shaft positioning mechanism, a drive wheel rotatably mounted on the shaft and provided with a clutch facing, a cylindrical sleeve member provided with a coacting clutch facing at one end thereof and slidably and non-rotatably mounted on the shaft and coaxial therewith, spring means mounted within said sleeve member and concentric with said shaft for maintaining said clutch facings in engagement, a plurality of stop rings adjustably mounted on said sleeve member, and a movable stop adapted for coaction with a selected one of said stop rings.

9. Shaft positioning mechanism comprising a series of stop rings having projecting lugs adjustably mounted with respect to the shaft, a movable stop movable on a line parallel to the axis of the shaft adapted for coaction with the projecting lug on a selected one of said stop rings, and a fixed stop adapted for coaction with the projecting lug on an end one of said series of stop rings, the fixed stop being provided to establish a "home" position for said shaft wherein all of said projecting lugs have been rotated beyond the line on which said movable stop is adjusted to selected position, said movable stop being adapted to establish the shaft in desired position in accordance with the arrangement of the projecting lug on the coacting stop ring.

10. In a shaft positioning system, a plurality of stop means adjustably mounted on the shaft and a movable stop adapted for coaction with a selected one of said stop means, means for separately rotating said shaft and moving said stop, and an automatic electrical control system including a cam and switch device for operating said shaft and said stop in a predetermined sequence of operations to establish the shaft in a "home" position, move said stop to a predetermined selected position and advance said shaft to desired operating position.

11. In a shaft positioning system, a plurality of stop means adjustably mounted on the shaft and a movable stop adapted for coaction with a selected one of said stop means, means for separately rotating said shaft and moving said stop, and an automatic control system including a cam and switch device for operating said shaft and said stop in a predetermined sequence of operations to establish the shaft in a "home" position and move said stop to a predetermined selected position for adjustment of the corresponding stop means.

12. In a shaft positioning system, a plurality of stop means adjustably mounted on the shaft and a movable stop adapted for coaction with a selected one of said stop means, means for separately rotating said shaft and moving said stop, an automatic electrical control system including a cam and switch device for operating said shaft and said stop in a predetermined sequence of operations to establish the shaft in desired position, and a manually operative switch device connected in said automatic control system and operative for limiting the sequence of operations to establish the shaft in a "home" position and move said stop to a predetermined selected position for adjustment of the corresponding stop means, subsequent operation of the entire predetermined sequence of operations for the same position of said stop being effective to establish the shaft in the position determined by the adjusted stop means.

13. A shaft positioning system comprising adjusted stop means for said shaft, a movable coacting stop, means for separately rotating said shaft and moving said stop, and an automatic control system for actuating the last said means comprising a dial impulse switch in combination with a minor switch having off-normal contacts for initiating operation of said control system, a source of power connected with a portion of said control system through said off-normal contacts, said portion of the system being operative to establish the shaft in a "home" position, a cam and cam switch device actuated with the shaft and operative with the shaft in "home" position to deenergize said portion and to supply power from said source to a second portion of said control system which includes means operative in combination with said minor switch to establish said movable stop in a selected position as determined by the operation of said dial impulse switch, a delay relay device connected with the last said means and operative after a time period subsequent to the establishment of said stop in selected position to supply power from said source to a third portion of said control system and simultaneously through a shunt circuit to the said relay device, the third portion of said system including means for establishing the shaft in desired position as determined by said stop means and the selected position of said coacting stop, said cam and cam switch device being operative with the shaft in desired position to deenergize said second portion and to supply power to a fourth portion of said control system which includes means operative to disconnect said source of power from the control system.

14. In a shaft positioning system including adjustable stop elements for said shaft, and a movable coacting stop, means for facilitating adjustment of said stop elements with respect to different positions of said stop comprising a dial impulse switch in combination with a minor switch having off-normal contacts, a source of power connected through said off-normal contacts with a portion of said means operative to establish the shaft in a "home" position, a cam and cam switch device actuated with the shaft in "home" position to deenergize said portion and to supply power from said source to a second portion of said means which includes means operative in combination with said minor switch to establish said movable stop in a selected position as determined by the operation of said dial impulse switch, a delay relay device connected with the last said means and operative after a time period subsequent to the establishment of said stop in selected position to supply power from said source to a third portion of the first said means, said third portion including means operative in combination with said cam and cam switch device with the shaft in "home" position to supply power to a fourth portion of the first said means operative to disconnect said source of power, the stop element corresponding to the selected position of said stop thereafter being manually adjusted to abut said stop with the shaft in a desired position.

15. In an automatic shaft positioning system, means for controlling the automatic operation of said system including a cam device comprising a disk having a body portion of a certain constant radius, a lobe portion of a larger constant radius, and a portion of a smaller constant radius adjacent said lobe portion, and a cam switch having a pilot member actuated by said cam; said cam switch having a single pole, double throw portion, and a single pole, single throw portion adapted for simultaneous action with one side of the single pole, double throw portion with said pilot member in contact with the lobe portion of larger radius on said cam.

16. In an automatic shaft positioning system, means for controlling the automatic operation of said system including a cam device comprising a disk having a principal operating portion of constant radius of substantially 200° of the circumference of the disk, and a raised lobe portion and a depressed portion at opposite ends of the aforesaid portion, reversible drive means connected with said shaft and said cam, and a cam switch actuated by said cam, said shaft and said cam being connected with said drive means with such ratio of movement that said shaft rotates substantially through its range of rotation for a corresponding movement of said cam through the said 200° portion thereof, said cam switch being adapted to control said drive means upon actuation by either the raised lobe portion or the depressed portion of said cam pursuant to operation of said cam and said shaft in either direction of movement.

17. In a shaft positioning system, a plurality of shafts, and individual positioning mechanisms therefore interconnected and actuated from drive means, each of said mechanisms including a slip clutch drive for said shafts and a selector drive connected with a selector stop, and means for automatically operating said drive means with respect to said clutch drive and said selector drive in a predetermined sequence of operations to establish each shaft in a "home" position, move the selector stops to desired position and advance the shafts to respective operating positions.

ARTHUR A. COLLINS.